United States Patent
Snitselaar et al.

(10) Patent No.: US 10,867,319 B1
(45) Date of Patent: Dec. 15, 2020

(54) SELECTION OF TARGETED MESSAGES FOR APPLICATION ON ITEM CONTAINERS

(71) Applicant: Amazon Technologies, Inc., Seattle, WA (US)

(72) Inventors: William Alan Snitselaar, Mount Pleasant, WI (US); Mangesh Suresh Kolharkar, Bothell, WA (US); Dean Christopher Fullerton, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1061 days.

(21) Appl. No.: 14/860,227

(22) Filed: Sep. 21, 2015

(51) Int. Cl.
G06Q 30/00 (2012.01)
G06Q 30/02 (2012.01)

(52) U.S. Cl.
CPC ..... *G06Q 30/0255* (2013.01); *G06Q 30/0269* (2013.01)

(58) Field of Classification Search
CPC .................................................. G06Q 30/02
USPC ............................................... 700/233, 235
See application file for complete search history.

(56) References Cited

U.S. PATENT DOCUMENTS

| | | | | |
|---|---|---|---|---|
| 2002/0026768 A1* | 3/2002 | Duncan | ............... | B65B 25/008 53/52 |
| 2004/0186776 A1* | 9/2004 | Llach | ................... | G06Q 30/02 705/14.66 |
| 2007/0112460 A1* | 5/2007 | Kiselik | ................. | G06Q 30/02 700/233 |
| 2008/0026319 A1* | 1/2008 | Stroh, III | ................ | B41M 5/26 430/270.1 |
| 2008/0040236 A1* | 2/2008 | Isowa | .................... | G06Q 30/02 705/14.73 |
| 2009/0298480 A1* | 12/2009 | Khambete | ......... | G06F 17/30699 455/414.1 |
| 2012/0176649 A1* | 7/2012 | Giordano | .............. | G06Q 30/00 358/1.18 |
| 2013/0310969 A1* | 11/2013 | Terzini | ............... | G06F 19/3462 700/235 |

OTHER PUBLICATIONS

Natalie J. Bruton, Profiling Laser Coding in the Packaging Industry, May 1997 p. 3-5 (Year: 1997).*

* cited by examiner

*Primary Examiner* — Abhishek Vyas
*Assistant Examiner* — Darnell A Pouncil
(74) *Attorney, Agent, or Firm* — Kilpatrick Townsend & Stockton LLP

(57) ABSTRACT

A container may hold one or more items and be associated with a customer order. The container may be identified as it moves along an inventory conveyance system. In response to identifying the container, a message may be selected that corresponds to one or more aspects of the customer order. The selected message may be provided to a laser marking system in a manner that allows the laser marking system to apply the message to the container as it moves along the inventory conveyance system.

18 Claims, 10 Drawing Sheets

SELECTION OF TARGETED MESSAGES FOR APPLICATION ON ITEM CONTAINERS

BACKGROUND

As part of shipping items to a purchaser, the items may be collected from a warehouse and placed in a packing box by an operator. The packing box may move through the warehouse on a conveyance system. The packing box may include a shipping label and other markings, some of which may be relevant to the items in the packing box.

BRIEF DESCRIPTION OF THE DRAWINGS

Various embodiments in accordance with the present disclosure will be described with reference to the drawings, in which.

DETAILED DESCRIPTION

Figure 1:
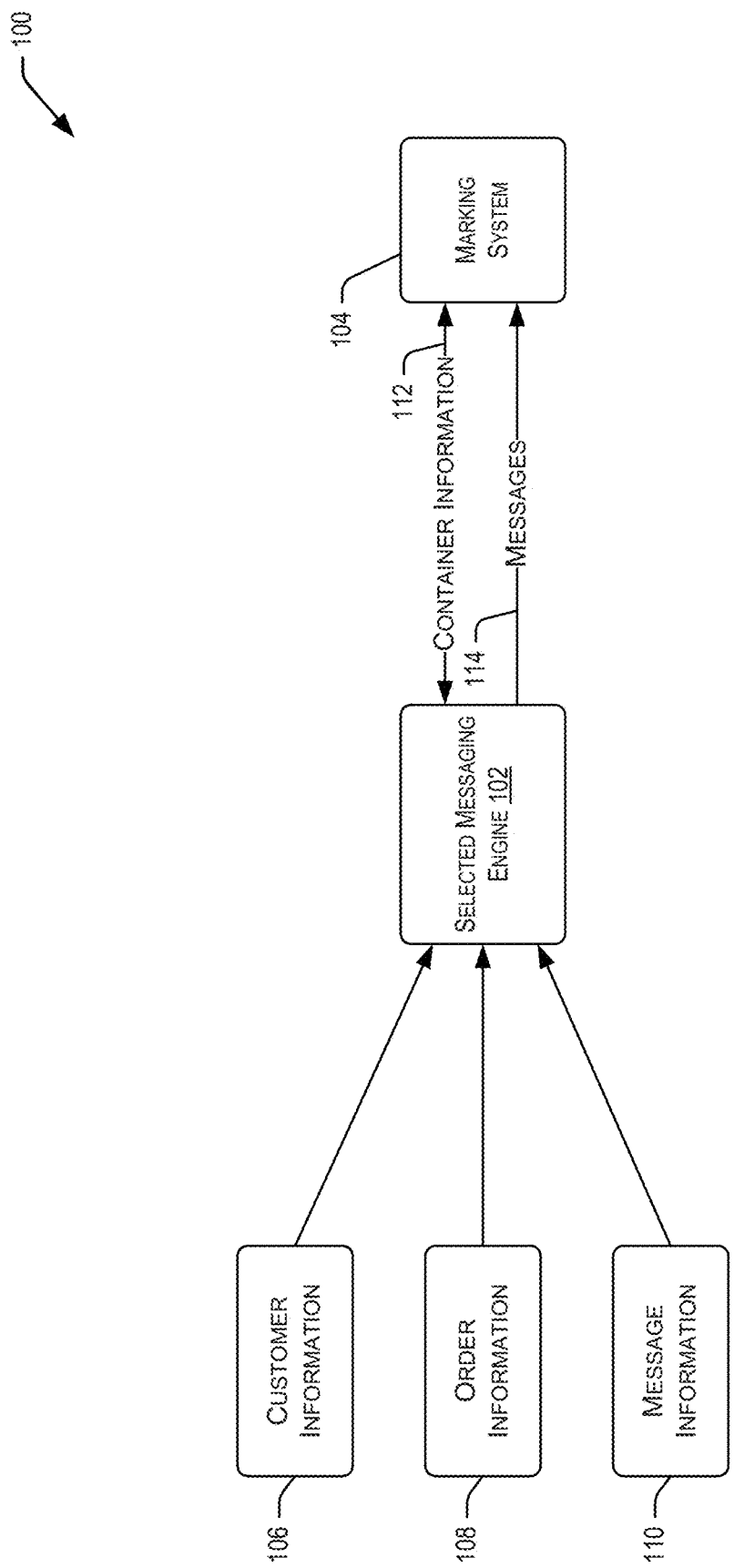
FIG. 1 is a diagram illustrating a system for implementing techniques related to selecting targeted messages for application on moving containers as described herein, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples herein are directed to techniques for selecting messages for application on containers. In particular, the techniques may be used to dynamically or statically select a message and to instruct a laser marking system to apply the message to a surface of a container. The container may be moving on a conveyance system in a warehouse as the message is selected and applied. In some examples, the message may be pre-selected, but may still be applied while the container is moving on the conveyance system. The message may be an advertisement, a customer-generated message (e.g., "To Abhishek, with love from Sarah" or "I miss you!"), a warning message (e.g., "POISON: DO NOT INGEST" or "May contain peanuts"), or any another suitable type of message (e.g., "THIS SIDE UP" or "Packed with recyclable materials"). In some examples, the message may include shipping information corresponding to a customer order associated with the container. In some examples, the size of the container may be determined by reading a container identifier label or a barcode attached to or printed on the container or by optically scanning the container. Based on the size of the container, the dimensions of the message may be scaled up or scaled down to correspond to the size of the container. In some examples, a customer associated with the container (or a customer order associated with the customer) may be identified based on the container identifier label or other suitable identifier attached to or printed on the container. Using the identity of the customer, customer information associated with the customer may be accessed. In some examples, the message may be selected based at least in part on the customer information. In this manner, the message may be considered a "targeted" message because it may correspond to attributes associated with the customer and identified from the customer information. In some examples, the message may be selected based at least in part on the size of the container. Once the message is selected, the message may be provided to the laser marking system. The laser marking system may apply the message to the container as the container moves along the conveyance system. In some examples, the laser marking system may apply the message to the container when the container is stopped near the laser marking system. In some examples, more than one message may be applied to the container on one or more sides of the container. The messages may cover entire sides of the container, or may be limited to specific portions of the container.

In some examples, third-parties (e.g., advertising entities) may initiate message orders for application of messages on containers. A message order may indicate a message and, in some examples, an appropriate audience for the message defined by one or more message order parameters. The message order, including the actual message, may be evaluated to ensure that the message can be applied to the containers (i.e., is printable). This may include, for example, evaluating message parameters that define characteristics of the message. For example, physical dimensions of the message may be compared with physical dimensions of available areas on the container, a time window for applying the message on the container while moving on the moving conveyance system may be determined, a length of time for how long it will take for the message to be applied to the container based on message dimensions, font(s), graphic(s), complexity of fonts and graphics, etc. may be determined, and any other suitable determinable or accessible message parameter pertaining to the message and/or the message order.

In some examples, effectiveness of a particular messaging campaign may be evaluated in accordance with techniques described herein. For example, an advertising entity may request (e.g., via a message order) that an advertisement for a new product be directed to a set of customers having certain characteristics. The advertisement for the new product will be applied to containers that include items ordered by customers of the set of customers. The fact that the advertisements were provided to the customers (i.e., via the containers) of the set of customers can be logged. Future orders placed by these customers for the new product or for a related product can also be logged. This logged information can be used to determine whether the messaging campaign actually encouraged purchases or resulted in customer engagement with the product, i.e., to determine its effectiveness. In some examples, other feedback may be collected directly from the customers. This may come in the form of an email message including a questionnaire, a QR barcode printed on the container that allows for positive and/or negative feedback, and/or any other suitable method.

Turning now to a particular example, a packing box moving on a conveyance system in a warehouse may be detected by a sensor reading a label on the packing box. Using the label or other information, a customer associated with the packing box (or a customer order) may be identified. Customer information corresponding to the customer may be retrieved. The customer information may include order history information, demographic information, customer preference information, and similar information corresponding to the customer (e.g., items in the packing box). The customer information may be analyzed to select a targeted message to apply to the packing box. Thus, the targeted message may be dynamically chosen for application on the packing box as the packing box moves on the conveyance system. Dimensions of the packing box may also be determined (or detected) and may be used to select the targeted message. Once the targeted message has been selected, it may be provided to a laser marking system to apply the targeted message to the packing box.

Turning now to the figures, FIG. 1 illustrates an example system 100 for implementing techniques related to selecting targeted messages for application on moving containers. To this end, the system 100 may include a selected messaging engine 102. The selected messaging engine 102, as described in detail herein, may communicate with a marking system 104 and one or more information systems configured to provide and/or allow access to certain types of information including, for example, customer information 106, order information 108, and/or message information 110. For example, the information 106, 108, and/or 110 may be received and/or accessed from an electronic marketplace.

The selected messaging engine 102 may be configured to communicate with the marking system 104 to receive portions of container information 112 from the marking system 104 and/or provide portions of the container information 112 to the marking system 104. For example, the marking system 104 may provide a first portion of the container information 112 to the selected messaging engine 102 that includes, for example, information such as dimensions of a container identified by a component of the marking system 104, areas on the container coated with laser-reactive coating, an orientation of the container with respect to a component of the marking system 104, and other similar information. At least some of the first portion of the container information 112 may be derived by reading an identifier located on the container or by optically scanning the container itself. The selected messaging engine 102 may process the first portion of the container information 112 to implement the techniques described herein. The selected messaging engine 102 may provide a second portion of the container information 112 to the marking system 104. The second portion of the container information 112 may include identification of an area of a container where a message may be applied.

The customer information 106 may include information about customers associated with specific orders. The information about customers may include order history information, customer preference information, demographic information, and other similar information.

The order information 108 may include information about a specific order associated with a container. The information may identify one or more items included in the order, item categories associated with the order, demographic information about customers who placed the orders for the one or more items, and other similar information.

The message information 110 may include information about a plurality of messages capable of being applied on the container. The information may include message files corresponding each of the plurality of messages, dimensions of each of the plurality of messages, target audiences for each of the plurality of messages, and other similar information.

The selected messaging engine 102 may analyze the customer information 106, the order information 108, the message information 110, and/or the container information 112 to select one or more messages 114. In some examples, the selected messaging engine 102 may select the one or more messages 114 from among a plurality of messages. The one or more messages 114 may correspond to dimensions of the container identified from the container information 112. In some examples, a plurality of messages may correspond to the customer information 106 and the order information 108, and more than one message may have appropriate dimensions for the container as identified from the container information 112. In this example, the selected messaging engine 102 may select the one or more messages 114 at random. In some examples, the selected messaging engine 102 may have a schema for selecting one or more messages 114 when a plurality of messages is appropriate.

In some examples, it may be determined that, based on the message information 110, a single message 114 is appropriate for a particular container. In this case, the selected messaging engine 102 may send the single message 114 to the marking system 104 and the marking system 104 may apply the single message to the particular container. In some examples, the selected messaging engine 102 may send one or more messages 114 and the container information 112 to the marking system 104. In this example, the marking system 104 may function to select a particular message 114 from the one or messages 114 based on the container information 112. In some examples, selecting the particular message 114 may include scaling up or scaling down a size of the particular message 114 based on the container information 112.

The marking system 104 may be configured to apply the one or more messages 114 on a container as it moves along a conveyance system. In some examples, the marking system 104 may apply the one or more messages 114 on a container at a point when the container is stopped adjacent to the marking system 104.

Figure 2:
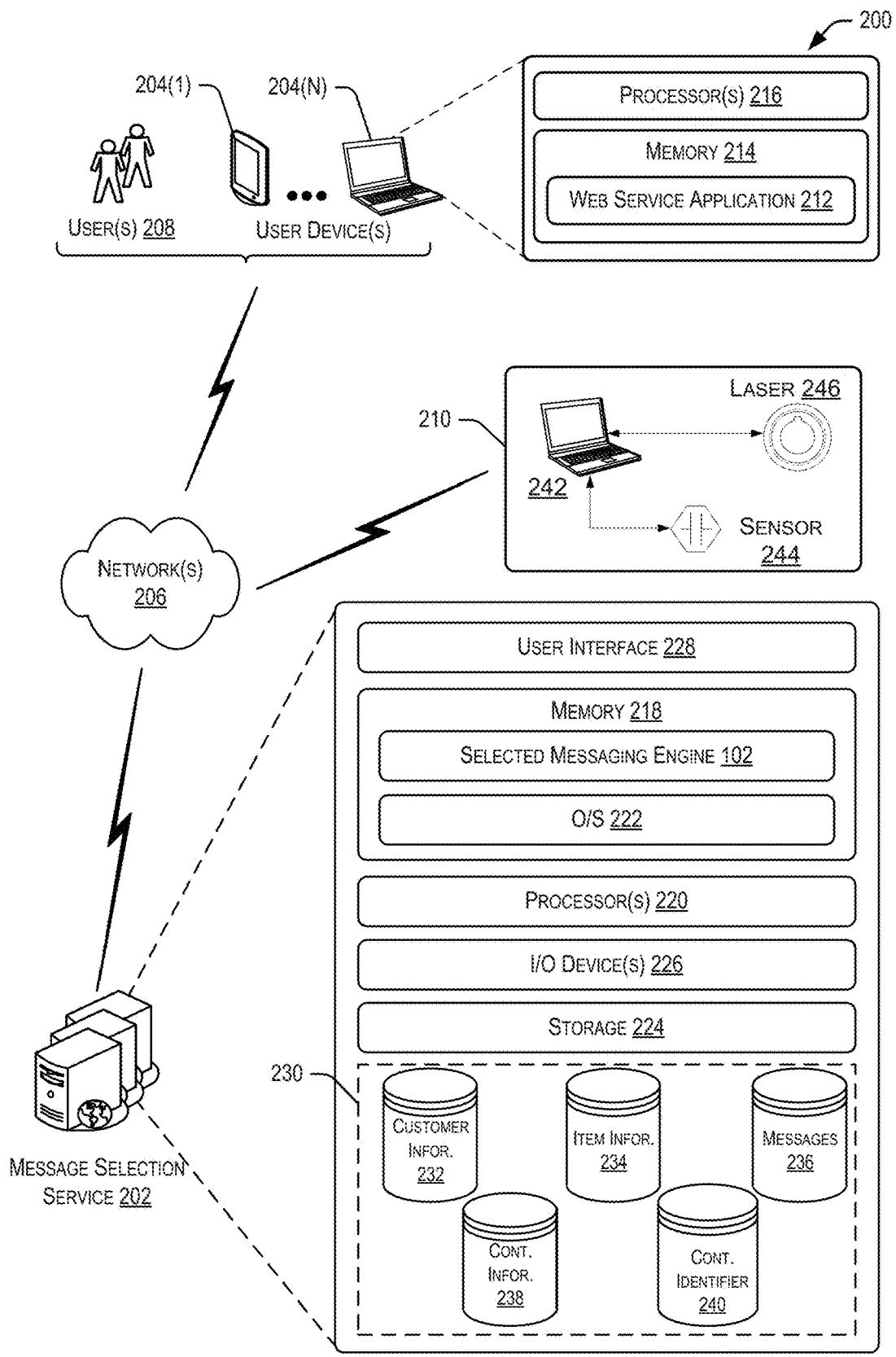
FIG. 2 is an architecture for implementing techniques relating to selecting targeted messages for application on moving containers as described herein, according to at least one example.

FIG. 2 illustrates an example architecture 200 for implementing techniques relating to selecting targeted messages for application on moving containers as described herein. The architecture 200 may include a message selection service 202 in communication with one or more user devices 204(1)-204(N) (hereinafter, "the user device 204") via one or more networks 206 (hereinafter, "the network 206"). The user device 204 may be operable by one or more users 208 (hereinafter, "the user 208") to interact with the message selection service 202. The network 206 may include any one or a combination of many different types of networks, such as cable networks, the Internet, wireless networks, cellular networks, and other private and/or public networks. The user 208 may be any suitable user including, for example, customers of an electronic marketplace that is associated with the message selection service 202, or any other suitable user.

The architecture 200 may also include a laser marking system 210 in communication with at least the message selection service 202 via the network 206 or any other suitable network. For example, the message selection service 202 may communicate with the laser marking system 210 via a local private network, while the message selection service 202 and the user devices 204 may communicate via a public network. In some examples, the message selection service 202 and the laser marking system 210 may be in communication via a hard-wired connection. In any event, instructions may be sent from the message selection service 202 via the network 206 to the laser marking system 210. In some examples, the laser marking system 210 sends information in the form of feedback to the message selection service 202 via the network 206 or otherwise (e.g., by writing to a disk and transferring).

Turning now to the details of the user device 204, the user device 204 may be any suitable type of computing device such as, but not limited to, a digital camera, a wearable device, a tablet, a mobile phone, a smart phone, a personal digital assistant (PDA), a laptop computer, a desktop computer, a thin-client device, a tablet computer, a set-top box, or any other suitable device capable of communicating with the message selection service 202 via the network 206 or any other suitable network. For example, the user device 204(1) is illustrated as an example of a smart phone, while the user device 204(N) is illustrated as an example of a laptop computer.

The user device 204 may include a web service application 212 within memory 214. Within the memory 214 of the user device 204 may be stored program instructions that are loadable and executable on processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The web service application 212, stored in the memory 214, may allow the user 208 to interact with the message selection service 202 via the network 206. Such interactions may include, for example, accessing customer information or accessing advertisements associated with the message selection service 202, and any other suitable client-server interactions. For example, when the message selection service 202 is associated with the electronic marketplace, the user device 204 may be utilized by the user 208 to search for items available in connection with the electronic marketplace and place orders for such items. These orders may be processed by the electronic marketplace, a part of which may include informing the message selection service 202 of the order and the customer (i.e., the user 208) that placed the order. The message selection service 202, whether associated with the electronic marketplace or not, may host the web service application 212.

Turning now to the details of the message selection service 202, the message selection service 202 may include one or more service provider computers, perhaps arranged in a cluster of servers or as a server farm, and may host web service applications. These servers may be configured to host a website (or combination of websites) viewable on the user device 204 (e.g., via the web service application 212). The user 208 may access the website to view messages that can be applied by the message selection service 202 (or an electronic marketplace associated with the message selection service 202). These may be presentable to the user 208 via the web service applications. In some examples, the user 208 may access the message selection service 202 to generate user-customized messages. For example, as part of a customer order, the user 208 may indicate a user-customized message that identifies that an item in the order is a gift. In some examples, the user 208 may access the message selection service 202 to generate other messages that can be applied by the laser marking system 210. In some examples, a particular component of the message selection service 210 may evaluate user-customized messages in accordance with techniques described herein.

The message selection service 202 may include at least one memory 218 and one or more processing units (or processor(s)) 220. The processor 220 may be implemented as appropriate in hardware, computer-executable instructions, software, firmware, or combinations thereof. Computer-executable instruction, software, or firmware implementations of the processor 220 may include computer-executable or machine-executable instructions written in any suitable programming language to perform the various functions described. The memory 218 may include more than one memory and may be distributed throughout the message selection service 202. The memory 218 may store program instructions that are loadable and executable on the processor(s) 220, as well as data generated during the execution of these programs. Depending on the configuration and type of memory including the message selection service 202, the memory 218 may be volatile (such as random access memory (RAM)) and/or non-volatile (such as read-only memory (ROM), flash memory, or other memory). The memory 218 may include an operating system 222 and one or more application programs, modules, or services for implementing the techniques described herein including at least the selected messaging engine 102.

In some examples, the laser marking system 210 may be configured to perform the techniques described herein with reference to the message selection service 202, including the selected messaging engine 102. For example, the laser marking system 210 may include a comparable engine to the selected messaging engine 102. In some examples, the user device 204 may be configured to perform the techniques described herein with reference to the message selection service 202, including the selected messaging engine 102. For example, the user device 204 may include a comparable engine to the selected messaging engine 102. In this example, the user 208 may use the user device 204 to specify certain messages and may also use the user device 204 to generate laser marking instructions.

The message selection service 202 may also include additional storage 224, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 224, both removable and non-removable, are examples of computer-readable storage media. For example, computer-readable storage media may include volatile or non-volatile, removable or non-removable media implemented in any suitable method or technology for storage of information such as computer-readable instructions, data structures, program modules, or other data. As used herein, modules, engines, and components, may refer to programming modules executed by computing systems (e.g., processors) that are part of the message selection service 202, the user device 204, and/or the laser marking system 210.

The message selection service 202 may also include input/output (I/O) device(s) and/or ports 226, such as for enabling connection with a keyboard, a mouse, a pen, a voice input device, a touch input device, a display, speakers, a printer, or other I/O device.

The message selection service 202 may also include a user interface 228. The user interface 228 may be utilized by an operator or one of the users 208 to access portions of the message selection service 202. In some examples, the user interface 228 may include a graphical user interface, web-based applications, programmatic interfaces such as application programming interfaces (APIs), or other user interface configurations. The message selection service 202 may also include a data store 230. In some examples, the data store 230 may include one or more data stores, databases, data structures, or the like for storing and/or retaining information associated with the message selection service 202. Thus, the data store 230 may include databases, such as a customer information database 232, an item information database 234, a messages database 236, a container information database 238, and a container identifier database 240.

The customer information database 232 may be used to retain information pertaining to customers of an electronic marketplace. Such information may include, for example, customer order information, historical order information, historical viewing information, demographic information, and/or customer preference information. Customer order information may include, for example, information associated with an existing customer order that identifies items included in the order, item categories to which the items belong, related item categories, a shipping address for the customer order, a recipient for the customer order, which may be different than the customer, a personalized message associated with the order, a shipping preference associated with the order, an indication regarding frequency of customer orders including the same items, and/or any other suitable information related to a customer order. Historical order information may include, for example, previous orders placed by the existing customer, previous payment methods from the customer, account information (e.g., electronic profiles for individual customers), and other suitable information related to historical order information. Historical viewing information may include, for example, items a customer viewed in association with an electronic marketplace, but did not ultimately purchase. This may also include number of views that a particular item has been viewed by the customer, items stored in digital repositories (e.g., "virtual carts"), and other similar information. Demographic information may include, for example, data about a customer including age, gender, geographic location, information about the customer's household (e.g., married, children, etc.), and other similar information. Customer preference information may include for example, payment instrument information for a customer (e.g., credit card, debit cards, bank account information, and other similar payment processing instruments), account preferences for the customer, shipping preferences for the customer, and other similar information pertaining to a particular customer and sets of customers, of an electronic marketplace.

The item information database 234 may be used to retain information pertaining to items provided in connection with an electronic marketplace, packaged in a warehouse, or otherwise processed in accordance with techniques described herein. Such information may include, for example, an item category to which a particular item belongs (e.g., household goods; electronic devices; home, garden and tools; sports and outdoors; books; beauty, health, and grocery; automotive and industrial; movies, music, and games; toys, kids and baby; clothing, shoes, and jewelry, etc.), a unique and/or generic item identifier associated with the item (e.g., a barcode, Uniform Product Code (UPC), a radio-frequency identification RFID number, etc.), demographic information for customers who purchase the particular item (e.g., women with one or more children who live in the Midwest), other items associated with the particular item (e.g., a towel may be associated with a bathrobe, a charger may be associated with a mobile phone, etc.), and other similar information pertaining to a particular item and sets of items.

The messages database 236 may be used to retain information about messages that can be applied to containers by the laser marking system 210. In some examples, the messages may be stored in a format that is recognizable by the laser marking system 210. In some examples, the messages may be stored in any other suitable format commonly used for storing image files. The messages that may be stored in the messages database 236 are various. For example, such messages may include advertisements (e.g., "Magnolia's Revenge: A Thriller"), customer-generated messages (e.g., "Happy birthday to my sister!"), regulatory warnings (e.g., "contains lithium-ion batteries"), information describing items in the box (e.g., "fragile," "do not take with alcohol"), opening instructions (e.g., "do not use knife"), handling and processing instructions (e.g., "deliver in-hand to recipient"), shipping information associated with customers (e.g., "2216 Broadway Circle, Richfield, Wash. 10000"), and any other suitable messages. The messages may include textual elements, graphical elements, and any suitable combination of the foregoing, which may include color. In some examples, within the messages database 236 may be stored various versions of particular messages. In some examples, the versions may differ one from another in terms of size (e.g., 5"×5" compared to 10"×10"), in terms of appropriate audience (e.g., appropriate for all audiences compared to mature audiences only), and in any other suitable manner. In some examples, each message may be associated with certain attributes. These attributes may be stored in the messages database 236 and may be used when selecting an appropriate message to apply to a container. The attributes may describe aspects of the messages and identify appropriate audiences and/or targeted audiences. For example, an advertisement for an upcoming children's movie may appeal to children and be associated with one or more attributes descriptive of the advertisement. These attributes may be used to select the advertisement using information from the item information database 234 that describes items which may also appeal to children (or parents of children).

The container information database 238 may be used to retain information about containers in which items are packed. For example, within the container information database 238 may be retained information describing dimensions of containers, information about location and type of laser-reactive coating on the containers, and information about how to scale up or down messages for certain container sizes. In some examples, the container information database 238 may be accessed by reading a barcode or container identifier associated with a container. For example, the barcode may be printed on the container and may resolve to the container information database 238.

The container identifier database 240 may be used to retain information associated with container identifiers. As described herein, container identifiers may be adhesive labels that may be attached to containers or other suitable identifiers. The container identifiers may be used to track containers as they move throughout a warehouse (e.g., on an inventory conveyance system). Information associated with a particular container identifier may include, for example, a customer, a recipient other than the customer, a customer order, a container, a set of dimensions corresponding to the container, a set of dimensions corresponding to areas including laser-reactive coating applied to the container, a shipping destination for the container, items associated with the customer order, items within the container, detailed shipping instructions, and any other suitable information. In some examples, the container identifier database 240 may have a key-value schematic, with the key being a container identifier, and the value being information about the customer, items, container, etc. associated with the container identifier.

The laser marking system 210 may include a computing device 242, a sensor 244, and a laser 246. The computing device 242 may be configured to manage operation of the sensor 244 and the laser 246. In some examples, the computing device 242 may receive instructions from the message selection service 202 to instruct the laser 246 to perform a certain operation (e.g., apply a message). In some examples, the message selection service 202 may be configured to receive sensing information from the sensor 244 and instruct the laser 246.

The sensor 244 may be any suitable sensor configured to detect a container, a container identifier, a barcode, and/or any other suitable information associated with a container. In some examples, the sensor 244 may be an optical sensor (e.g., a scanner, imaging device, and the like). As the sensor 244 identifies a container, the sensor 244 may send information to the computing device 242. The computing device 242 may be in communication with the message selection service 202 via the network 206. After one or more messages are selected by the message selection service 202, or, in some examples by the computing device 242, the one or more messages may be passed through the network 206 to the computing device 242. The computing device 242 may provide the one or more messages to the laser 246 to be applied on the container identified by the sensor 244. In some examples, this may include the computing device 242 converting the one or more messages into a set of instructions executable by the laser 246.

The laser 246 may be any suitable laser configured to apply a customized message to a container. For example, the laser 246 may be a carbon dioxide laser configured to apply a customized message including text and/or graphics on any suitable material including, for example, cardboard, paper, plastic, coated materials, wood, metal, packaging foils, glass, and any other similar material. In some examples, the laser 246 may apply the customized message on a cardboard substrate (e.g., a side of a container) by causing a reaction between a laser-reactive coating applied to the cardboard substrate and the energy applied by the laser 246. In some examples, in lieu of the laser 246, other suitable printing devices may be used.

In some examples, in addition to or instead of the laser marking system 210, a high resolution ink jet printing system or any other suitable printing system may be used. The high resolution ink jet printing system or other suitable printing system may also be configured to perform similar functions as the laser marking system 210.

Figure 3:
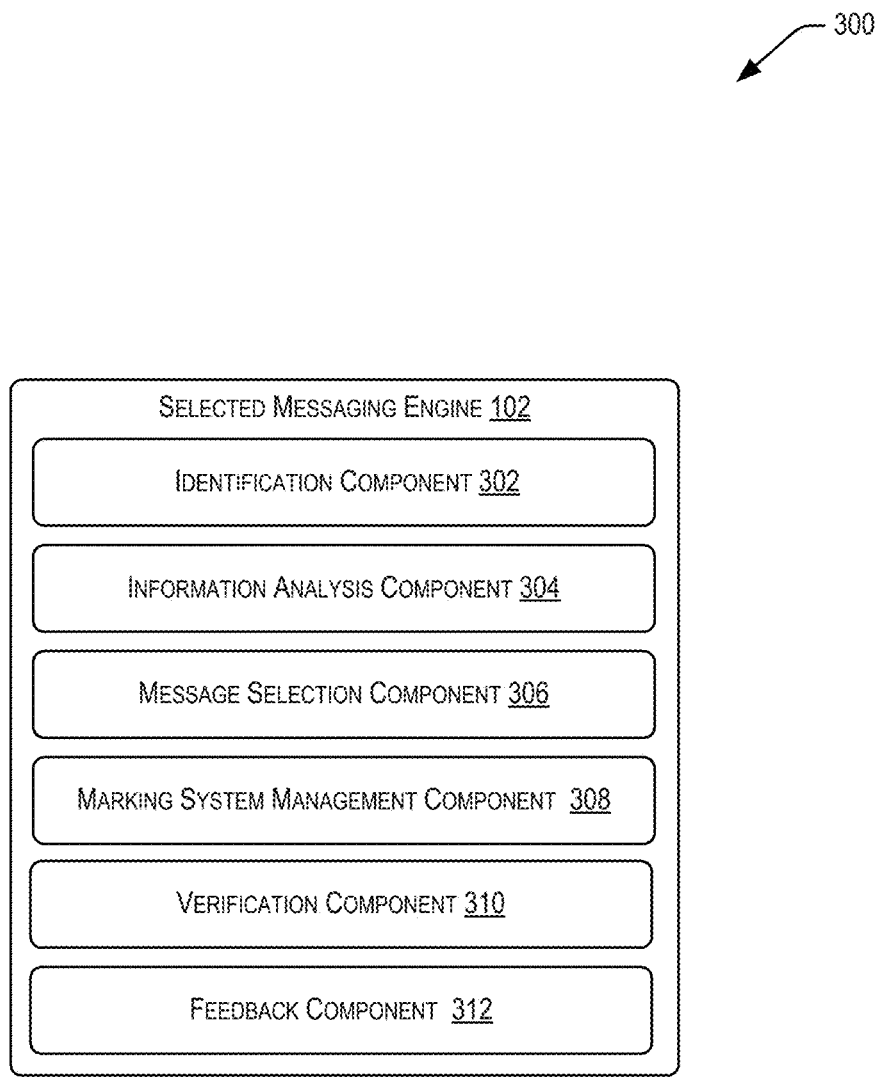
FIG. 3 is an example device for implementing techniques related to selecting targeted messages for application on moving containers as described herein, according to at least one example.

FIG. 3 is an example device 300 for implementing aspects of the selected messaging engine 102. The selected messaging engine 102 may be configured to implement the functions described herein with reference to the message selection service 202. In particular, the selected messaging engine 102 may be configured to manage one or more sub-modules, components, and/or services directed to examples disclosed herein. In some examples, the selected messaging engine 102 may include an identification component 302, an information analysis component 304, a message selection component 306, a marking system management component 308, a verification component 310, and a feedback component 312. While these components are illustrated in FIG. 3 and will be described as performing discrete tasks with reference to the flow charts, it is understood that FIG. 3 illustrates example configurations and other configurations performing other tasks and/or similar tasks as those described herein may be implemented according to the techniques described herein. Other module, components, or engines may perform the same tasks as the selected messaging engine 102 or other tasks and may be implemented in a similar or different fashion.

The identification component 302 may be configured to receive information from one or more sensors collected from container identifiers, barcodes, and/or other aspects of containers. In some examples, the identification component 302 may process the information from a container identifier. As described herein, the container identifier may be associated with information related to an order, a customer, items in the container, a size of the container, and/or other similar information. Based at least in part on the container identifier, the identification component 302 may identify the customer order, the customer, the items in the container, the size of the container, and other similar information. In some examples, the identification component 302 may process the information from a container barcode. Similar to the container identifier, the container barcode may be associated with information regarding the container (e.g., a size of the container, dimensions of the container, where laser-reactive coatings are located on the container, and other similar information). The identification component 302 may identify those aspects from the raw data from the container identifier or the container barcode. In other examples, the identification component 302 may identify the presence of a container and dimensions of the container based on information received from the one or more sensors, e.g., imaging sensors.

The information analysis component 304 may be configured to access information identified by the identification component 302. The information analysis component 304 may also be configured to analyze the information it accesses from the identification component 302. In some examples, the information analysis component 304 may access various data points related to the order, the customer, items in the container, the size of the container, and other similar information. The information analysis component 304 may then analyze the data points to provide as inputs to the message selection component 306. In some examples, the information analysis component 304 may analyze information such as the customer's order history, demographic information about the customer, item category for items in the container, and other similar information.

The message selection component 306 may be configured to select a message for a laser marking system to apply to a container as described herein. In some examples, the message selection component 306 may receive input from the information analysis component 304. The message selection component 306 may use the input to select an appropriate message from a plurality of messages. In some examples, the appropriate message may be a message that is targeted to aspects of a customer associated with a customer order or with the customer order itself. In some examples, the message selection component 306 may receive raw data selected by the information analysis component 304. The message selection component 306 may conduct some analysis to select one or more messages. In some examples, after selecting a message, the message selection component 306 may provide the selected message to the marking system management component 308.

The marking system management component 308 may be configured to manage the operation of a marking system. In some examples, the marking system management component 308 may provide one or more distinct messages to a marking system for each container as each container moves through a conveyance system. In this example, as each distinct container is identified by the identification component 302, information is accessed and analyzed by the information analysis component 304, one or more messages are selected by the message selection component 306, and one or more distinct messages are provided to a marking system by the marking system management component 308 for each distinct container in real time. In other examples, the marking system management component 308 may provide one message with one set of dimensions to the marking system to be applied to multiple containers as the containers move through the conveyance system. In other examples, the marking system management component 308 may provide one message but adjust the dimensions of the message based on a container size as different-sized containers move through the conveyance system.

The verification component 310 may be configured to receive message orders from the user device 204, which may be operated by message creation entities (e.g., the users 208), and evaluate messages associated with the message orders. Advertising entities are examples of the message creation entities. A message order may include a message and an audience to which the message should be targeted. In some examples, the message order only includes the message. The verification component 310 evaluates characteristics of the message in light of capabilities of the laser marking system 210 and physical limitations of containers to determine whether the message is printable on the containers. For example, the verification component 310 may compare physical dimensions of the message with physical dimensions of available areas for messages on a set of containers to identify on which containers the message could be applied. This may be a subset of the set of containers. As another example, font, font size, graphics, line thickness, shading, colors, etc. of the message may be evaluated in light of capabilities of the laser marking system 210 to determine whether the laser marking system 210 can print the message and a time needed to do so. This may consider a rate at which the laser marking system 210 can print the message and a rate at which a conveyance system is moving the container on which the message will be printed. If the message is not printable, the verification component 310 may inform the message creation entities via a notification. This may include suggestions for modifying the message. In some examples, a human operator participates in the verification process using similar functionality as the verification component 310.

In some examples, the verification component 310 may determine or verify an appropriate audience for a particular message, an appropriate geographic location for a particular message, and any other suitable aspect related to targeting the particular message. For example, a message order indicating a message and a few characteristics describing a desired audience can be compared to other similar messages and to attributes of customers associated with the electronic marketplace to determine a particularized audience (e.g., a set of customers) for the message.

The feedback component 312 may be configured to evaluate messaging campaigns. This may include evaluating the messaging campaigns in accordance with any suitable metric such as completion of purchase, engagement, understanding, return on investment, return on marketing investment, reach of the messaging campaign, frequency of the messaging campaign per household/customer, gross rating points, target rating points, impressions, cost per thousand, cost per point, and any other suitable metric. Evaluation of one or more of these metrics may be used to determine an overall effectiveness of the messaging campaign and/or engagement with the message.

In some examples, the feedback component 312 may receive a communication each time a message is applied to a container. Based on this communication, the feedback component 312 may log information describing the message, a customer associated with the container, and a customer order associated with the customer. In some examples, the feedback component 312 also logs other information describing how the message selection component 306 selected the message. For example, which parameters of the customer and parameters of the message were relevant to its selection may be logged. This other information may be used to improve the message selection process in the future to ensure that relevant messages are selected. In any event, the feedback component 312 may also log additional information related to the customer and/or the message. For example, if the message is an advertisement for a new book, the feedback component 312 can log whether, after the customer was exposed to the advertisement, the customer researched the book on the electronic marketplace, placed the book in a virtual shopping cart or on a wishlist, purchased the book, purchased the book for a gift, purchased a related book (e.g., an earlier book in a series), and any other suitable information associating the customer with the book. This additional information may be considered feedback and may be descriptive of engagement with the product included in the advertisement. In some examples, the feedback component 312 may receive other feedback in the form of solicited feedback (e.g., via emails, phone calls, text messages, notifications in a message client associated with the electronic marketplace, etc.), volunteered feedback (e.g., a barcode printed or applied on the container that requests feedback ("Scan this QR code if this advertisement is relevant to you")), and any other suitable method. The results of this analysis can be provided to the entity that uploaded the message order and/or the entity that operates the message selection service 202 to improve upon the techniques described herein.

The feedback component 312 may also evaluate such information to determine whether the message should be changed. For example, if engagement with the message is low, the feedback component 312 may compare the message with other messages that have better engagement to recommend changes to the message. These changes can be provided to the entity that created the message and/or uploaded the message order.

In some examples, the feedback component 312 may recommend that the message campaign be terminated if engagement with the message falls below some threshold. The threshold may be set by the entity that created the message and/or a different entity that operates the message selection service 202.

Figure 4:
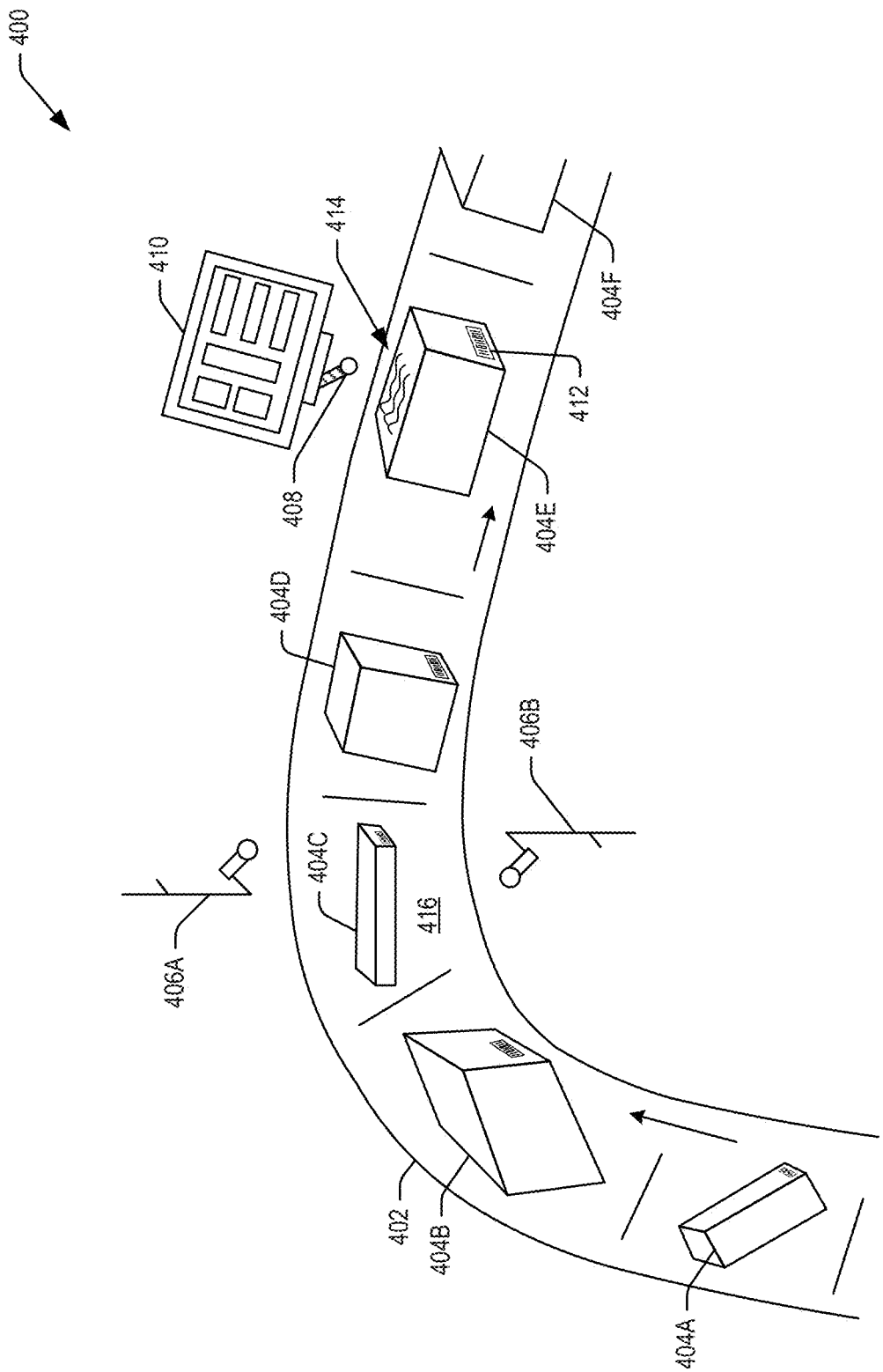
FIG. 4 is an example of an inventory system for implementing techniques related to selecting targeted messages for application on moving containers as described herein, according to at least one example.

FIG. 4 illustrates an example marking system 400 including an inventory conveyance system 402, a plurality of containers 404 being carried on a moving surface 416 of the inventory conveyance system 402, sensors 406A, 406B, a laser 408, and a computing device 410 in communication with the sensors 406, the laser 408, and the message selection service 202. The sensors 406 are examples of the sensor 244 described herein. Similarly, the laser 408 is an example of the laser 246 and the computing device 410 is an example of the computing device 242. The inventory conveyance system 402 may be any suitable inventory conveyance system capable of moving the plurality of containers 404. The moving surface 416 may be configured to move the containers 404 in the direction of the arrows—i.e., generally left to right across FIG. 4. The moving surface 416 may be an example of a conveyor belt, moving rollers, or other suitable devices for moving the containers 404.

In some examples, each container of the plurality of containers 404 may have unique dimensions. For example, each container of the plurality of containers 404 may be customized depending on items to be included in the container. In this example, at an earlier location along the inventory conveyance system 402 a container manufacturing machine may manufacture customized containers. In accordance with techniques described herein, even though each container may have a unique size, a message may nevertheless be selected and applied to at least one side of each container. In some examples, each container of the plurality of containers 404 may be one of a fixed number of standard container sizes. Each standard container size may include fixed dimensions and a fixed volume. In some examples, each container of the plurality of containers 404 may be of the same size. In other words, the inventory conveyance system 402 may, at times, be dedicated to carrying containers of one container size. In some examples, the orientation of each container of the plurality of containers 404 may be varied, whether intentionally or as part of a loading process in which the containers 404 are loaded onto the moving surface 416. In this example, the techniques described herein may be implemented to not only identify a particular container 404, but may also identify an orientation of the particular container 404 with respect to the laser 408. In some examples, the orientation of the containers 404 may be uniform and/or fixed (e.g., aligned such that a surface that includes a container identifier 412 is leading and a top opening of the container 404 faces up).

In some examples, the containers 404 may include one or more items, which have previously been placed in the containers 404 and which may be associated with customer orders. In some examples, the containers 404, after having messages applied thereon in accordance with techniques described herein, may be moved to a labeling and taping station where a shipping label may be applied or printed on each container 404 and each container may be taped shut. Examples of the containers 404 may include packing boxes, packing mailer envelopes, packing crates, and any other suitable container, any of which may be constructed of cardboard, plastic, or other suitable material.

In some examples, the inventory conveyance system 402 may be configured to move the containers 404 between different locations within a warehouse. At least one of the sensors 406 may read container identifiers (e.g., the container identifier 412 called out on the container 404E) located on at least one side of each of the containers 404. In some examples, at least one of the sensors 406 may read barcodes located on at least one side of each of the containers 404. In some examples, at least one of the sensors 406 may optically scan the containers 404 moving along the inventory conveyance system 402 to identify information corresponding to the dimensions of the containers 404. In some examples, the sensors 406 may also detect orientations of the containers 404.

As described herein, the marking system 400 may be configured to statically or dynamically select one or more messages 414 to be applied to the containers 404. In a static example, a message 414 (e.g., a file that includes a representation of the message) may be stored in association with the computing device 410 (or in association with the message selection service 202), and when an appropriate container 404 is identified by computing device 410 (or the message selection service 202) based on information collected from the sensors 406, the message may be provided to the laser 408 to be applied to the appropriate container 404. In some examples, the appropriateness of the container 404 may depend on a size of the container 404, contents of the container 404, attributes of a customer associated with the contents of the container 404, and/or any other suitable information described herein.

In a dynamic example, a plurality of messages 414 (e.g., files that include representations of messages and representations of versions of messages) may be may be stored in association with the computing device 410 (or in association with the message selection service 202), and when an appropriate container 404 is identified by computing device 410 (or the message selection service 202), a message 414 may be selected from the plurality of messages. In some examples, the appropriateness of the container 404 may depend on a size of the container 404, contents of the container 404, attributes of a customer associated with the contents of the container 404, and/or any other suitable information described herein. Thus, in some examples, the message 414 may be selected in a manner that is targeted to the customer, a recipient of the container 404, the order, or any other attribute associated with the container 404.

In some examples, the selected message 414 may be provided to the laser 408. This may include providing a file that corresponds to the selected message 414, providing an instruction executable by the laser 408, or any suitable combination of the foregoing. The laser 408 may mark the container 404E with the selected message 414 as the container 40E is in motion (i.e., is being moved by the moving surface 416). In some examples, one or more messages 414 may be provided to the laser 408. The laser 408 may be configured to apply the one or more messages 414 to the container 404E as the container 404E travels on the moving surface 416 of the inventory conveyance system 402. In some examples, the one or more messages 414 may be applied on the same side of the container 404E or on different sides. In some examples, the laser 408 may include two or more lasers configured to apply messages at about the same location (e.g., on the same side of the container 404E). In some examples, the laser 408 may include two or more lasers configured to apply messages at different locations at about the same time. For example, a first laser 408 may apply a first message on a first side of the container 404E at a first time, while a second laser 408 may apply a second message on a second side of the container 404E at about the first time. In some examples, depending on the dimensions of the container 404E, the message 414 may be scaled up or down to fit an available area on the side of the container 404E. In some examples, the containers 404 may continue to move down the moving surface 416 of the inventory conveyance system 402 as the laser 408 marks each consecutive container 404E, 404D, 404C, and so forth with the same or different messages 414. In some examples, moving surface 416 may stop or at least slow down momentarily while the laser 408 applies the message 414 to the container 404E.

Figure 5:
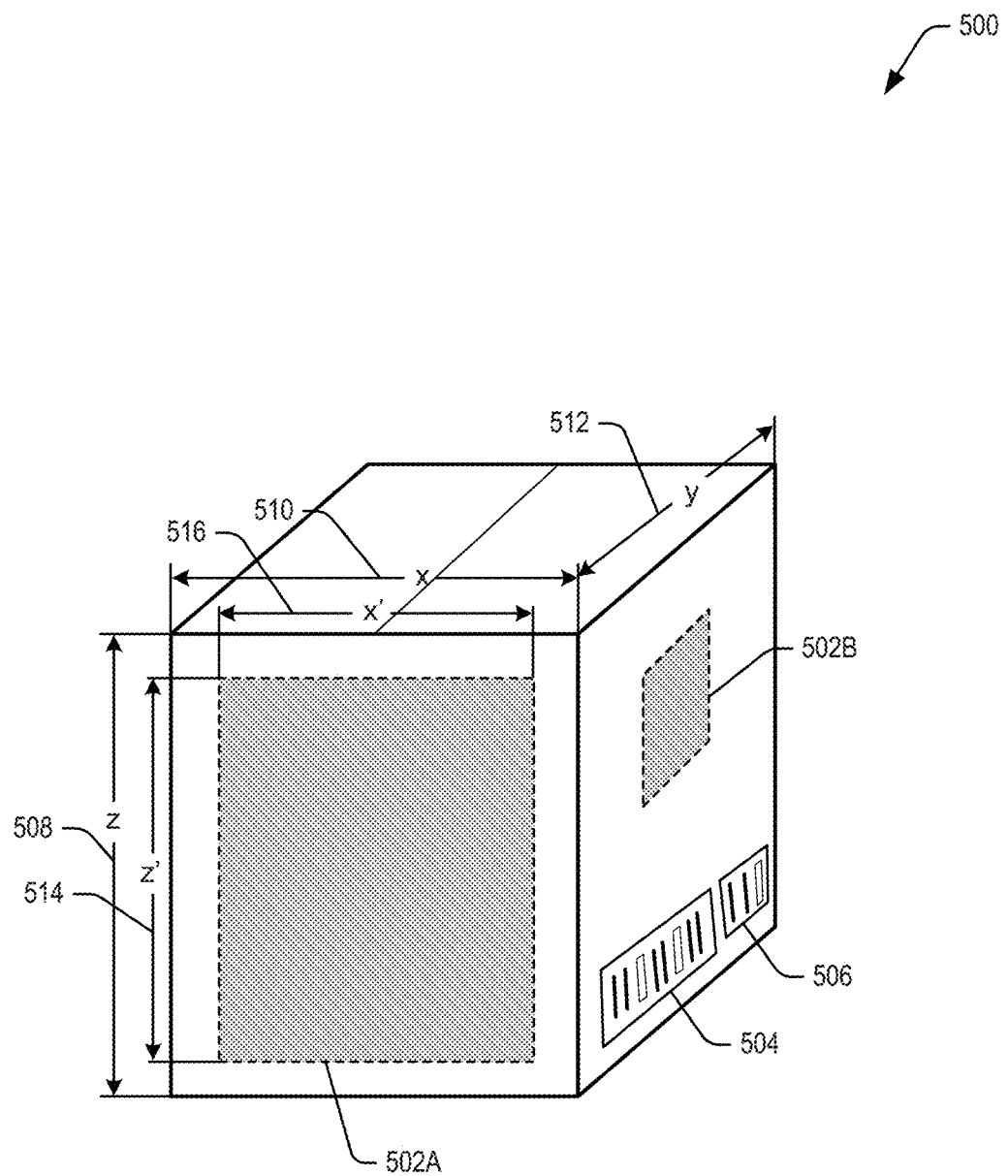
FIG. 5 is an example of a container that may be used for implementing techniques related to selecting targeted messages for application on moving containers as described herein, according to at least one example.

FIG. 5 illustrates an example container 500 with areas 502A, 502B coated with laser-reactive coating, a container identifier 504, and a barcode 506. The container 500 may be any suitable container configured to receive items and may be constructed of any suitable material including, for example, cardboard, paper, plastic, coated materials, wood, metal, packaging foils, glass, and any other similar material.

The container 500 may be defined by a set of dimensions (510, 512, and 508). In some examples, the set of dimensions 510, 512, and 508 may be stored in association with a database that stores information about the container 500. In some examples, the set of dimensions 510, 512, and 508 may be determined based at least in part on sensing information captured by a sensor as the container 500 moves on an inventory conveyance system.

The areas 502A, 502B represent areas where laser-reactive coating has been pre-applied to the container 500. In some examples, the laser-reactive coating may have been applied as part of an earlier process. In some examples, greater or fewer areas may include laser-reactive coating. The laser-reactive coating may be any suitable material capable of reacting when a beam of a laser (e.g., a carbon dioxide laser) comes into contact with the laser-reactive coating. In some examples, each of the areas 502A, 502B may be defined by a set of dimensions. For example, the area 502A may be defined by a set of dimensions 514, 516. In some examples, the set of dimensions 514, 516 may be stored in association with a database that stores information about the container 500. In some examples, the set of dimensions 514, 516 may be determined based at least in part on sensing information captured by a sensor as the container 500 moves on an inventory conveyance system. In some examples, a sensor may sense both the set of dimensions 510, 512, and 508 of the container 500 and the set of dimensions 514, 516 of the areas 502A, 502B. In some examples, to determine locations of the areas 502A, 502B, the sensor may scan for chemical differences in the material of the container 500. The sensor may also detect color differences in the material of the container 500.

The container identifier 504 is an example of the container identifier 412. The container identifier 504 may be an optical machine-readable representation of data, which may include any suitable arrangement of graphics, images, letters and/or numbers (e.g., a data matrix code, a QR code, a barcode, a high capacity color code, and any other suitable code). The container identifier 504 may, in some examples, be in the form of a radio-frequency identification (RFID) tag or nanotag attached to the container 500. In some examples, the container identifier 504 may be entirely unique. In some examples, the container identifier 504 may be a pre-printed label that includes a unique or semi-unique barcode, which may have two or more dimensions. The container identifier 504, in the form of the label or otherwise, may be applied to the container 500 at a time prior to the container identifier 504 being read by a sensor, as described herein. Reading the container identifier 504 may enable access to a data set that includes information associated with the container identifier 504, as described herein.

Like the container identifier 504, the barcode 506 may be an optical machine-readable representation of data, which may include any suitable arrangement of graphics, images, letters and/or numbers (e.g., a data matrix code, a QR code, a barcode, a high capacity color code, and any other suitable code). The barcode 506 may be associated with the container 500. In some examples, the barcode 506 is printed on the container 500 at or around a time when the container 500 is manufactured. Thus, the barcode 506 may be associated with information that describes manufacturing aspects of the container 500. For example, such information may include dimensions of the container 500, a standard size of the container 500, a custom size of the container 500, and any other suitable information. In some examples, the barcode 506 also includes human-readable information that may or may not correspond to machine-readable information. For example, the human-readable information may be "A0; 10.25×10×2.25" and the machine-readable information may also include the same information in a machine-readable format.

Figure 6:
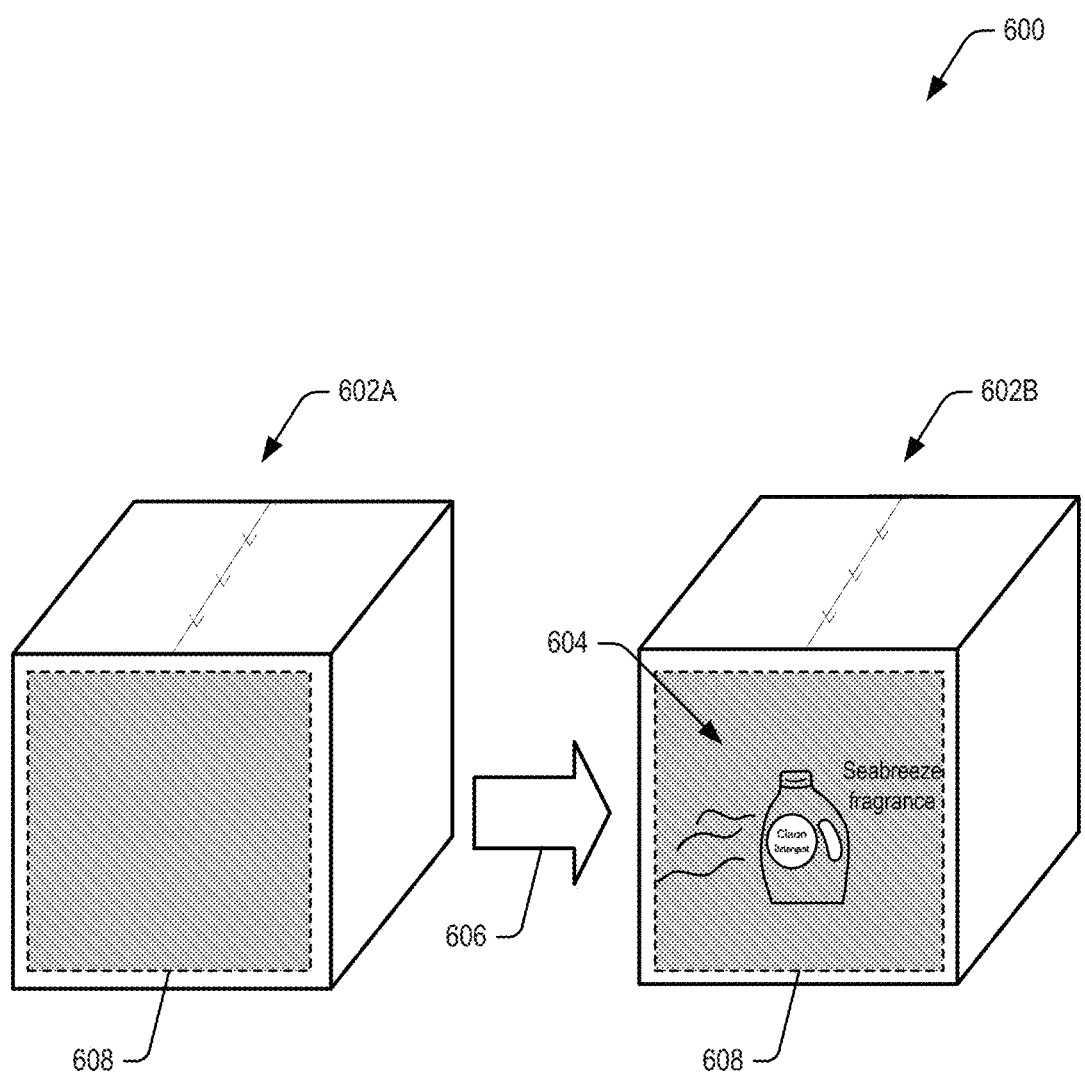
FIG. 6 is an example of a container before and after being marked in accordance with techniques described herein, according to at least one example.

FIG. 6 illustrates an example of a container 602 at two states, 602A and 602B. 602A is an example of the container before marking (i.e., the "unmarked container 602A") and 602B is an example the container after the unmarked container 602A has been marked in accordance with techniques described herein (i.e., the "marked container 602B"). In some examples, the container 602 may include a marking area 608, which may include a laser-reactive coating applied therein. The marked container 602B may have been marked with an advertisement 604. In some examples, arrow 606 indicates that a marking process has been performed on the unmarked container 602A to result in the marked container 602B. The advertisement 604 may have been applied to the marked container 602B by a laser, as described herein. In some examples, the unmarked container 602A may have no messages on it prior to the unmarked container 602A being marked. In some examples, the unmarked container 602A may have one or more other messages printed or applied on the unmarked container 602A prior to the unmarked container 602A being marked. As described herein, instead of or in addition to the advertisement 604, a message including a second advertisement, a warning message, a customer-generated message, a shipping message (e.g., a message that includes information similar to a shipping label), or any other suitable message may be marked on a side of the unmarked container 602A.

Figure 7:
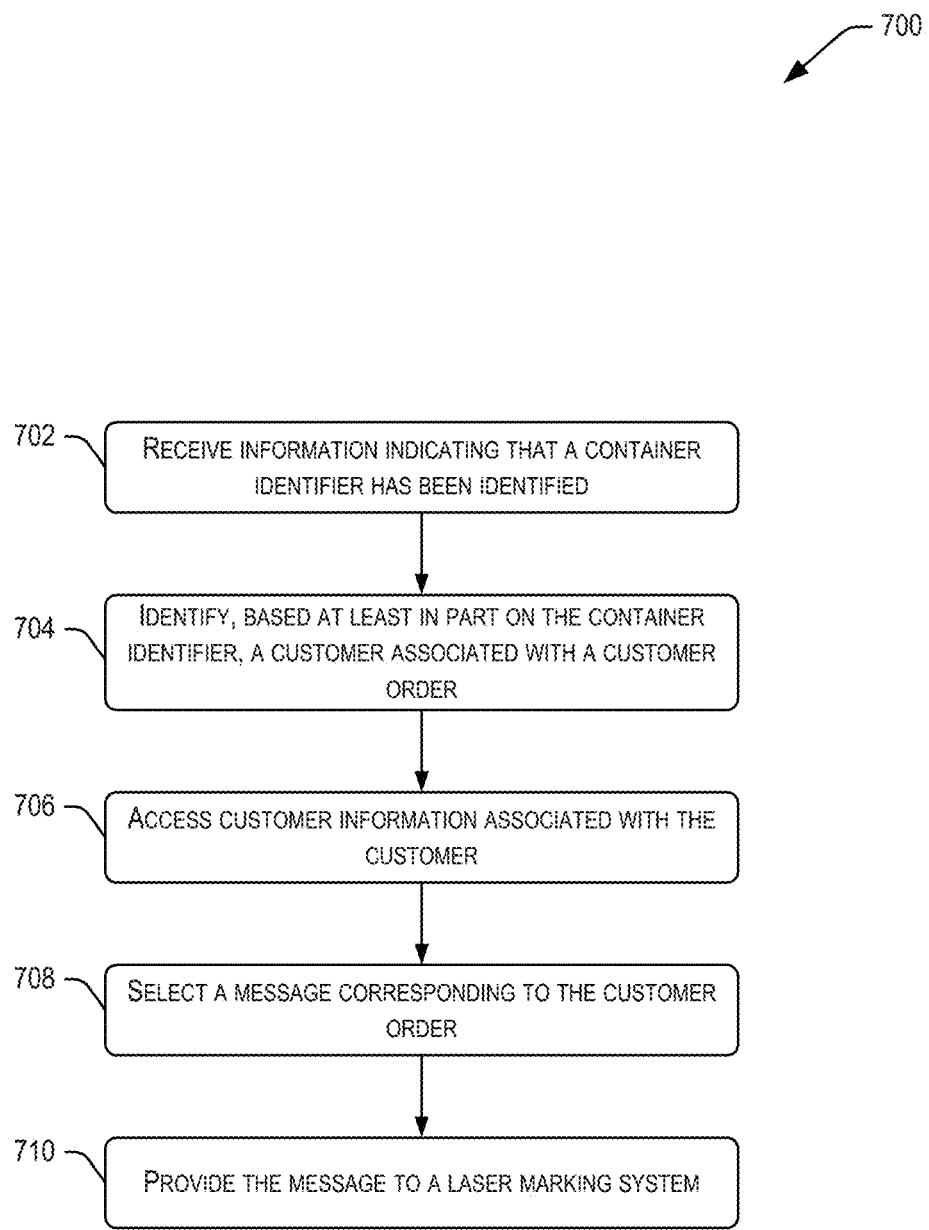
FIG. 7 is an example flow diagram for implementing techniques related to selecting targeted messages for application on moving containers as described herein, according to at least one example.
Figure 8:
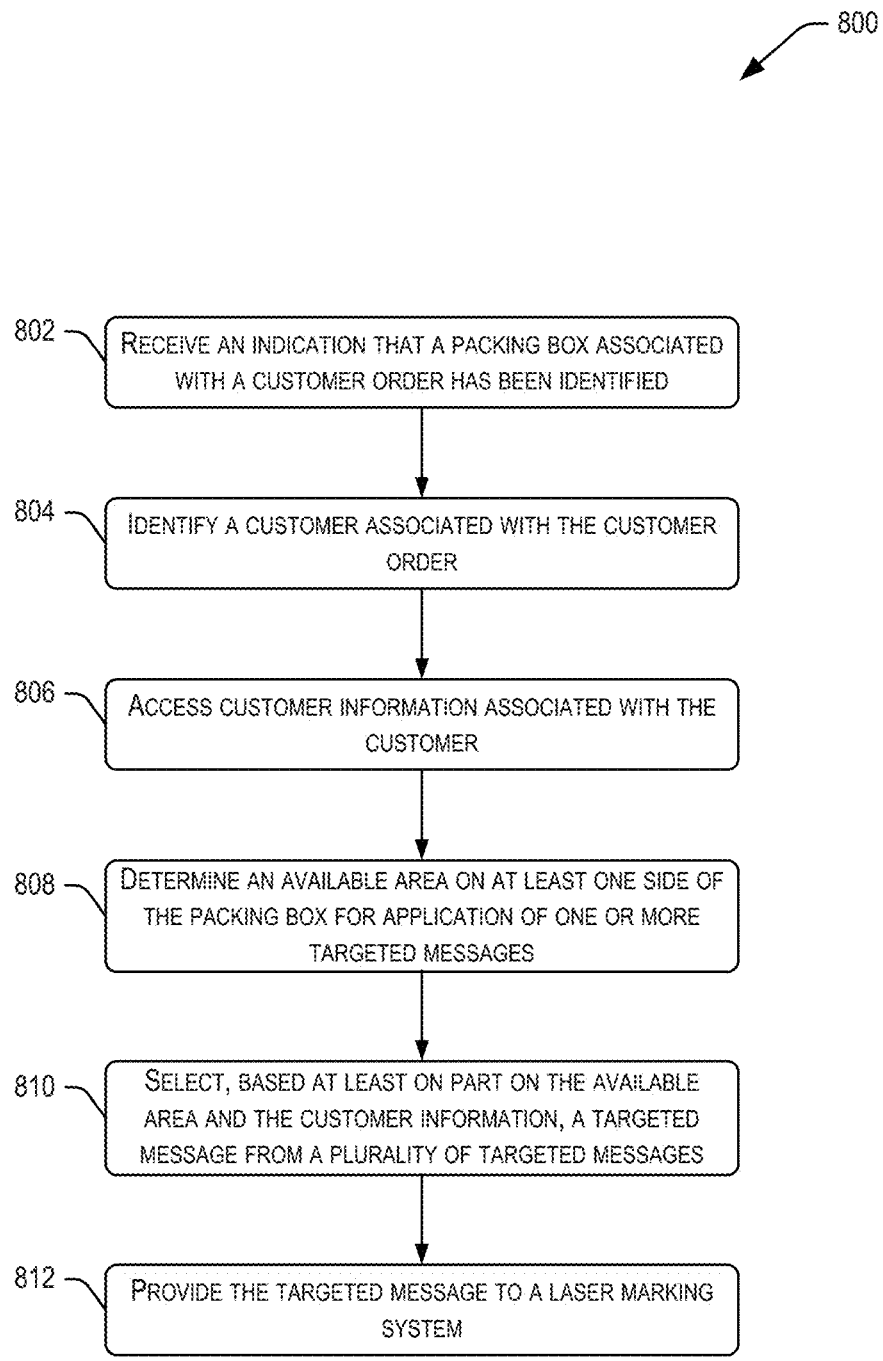
FIG. 8 is an example flow diagram for implementing techniques related to selecting targeted messages for application on moving containers, as described herein, according to at least one example.
Figure 9:
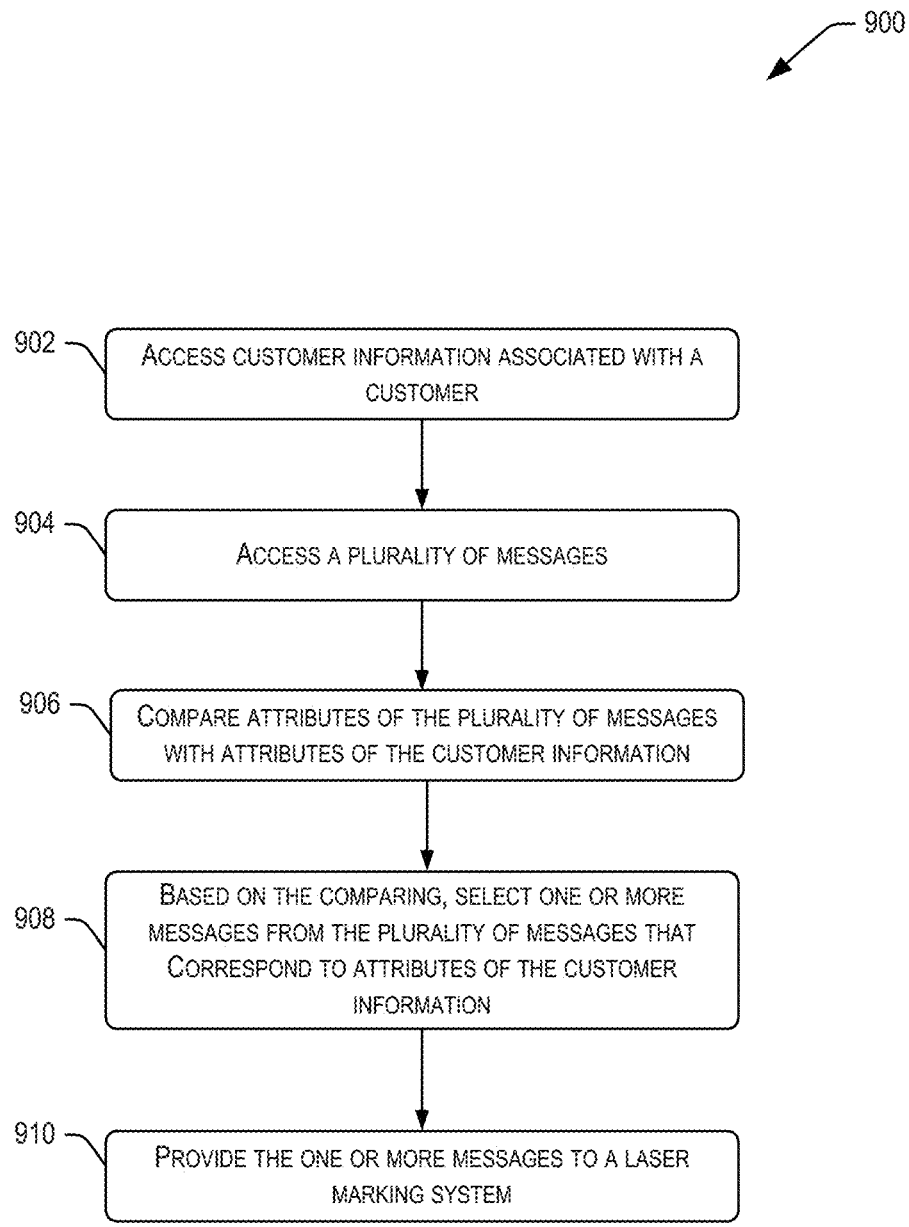
FIG. 9 is an example flow diagram for implementing techniques related to selecting targeted messages for application on moving containers as described herein, according to at least one example.

FIGS. 7, 8, and 9 illustrate example flow diagrams showing respective processes 700, 800, and 900 as described herein. These processes 700, 800, and 900 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 7 depicts the process 700 including example acts or techniques relating to selecting messages for application on item containers as described herein. The selected messaging engine 102 (FIG. 1) may perform the process 700 of FIG. 7. The process 700 begins at 702 by receiving information indicating that a container identifier has been identified. In some examples, receiving the information indicating that the container identifier has been identified may be performed by the identification component 302 (FIG. 3). In some examples, the container identifier may be in the form of a label and may be attached to a side of a container. The container identifier may be read by a sensor as the container moves through an inventory conveyance system. In some examples, the container identifier may be read when the container's movement through the inventory system is momentarily paused.

At 704, the process 700 identifies a customer associated with a customer order based at least in part on the container identifier. In some examples, identifying the customer associated with the order may be performed by identification component 302. In some examples, after the container identifier has been identified, a sensor may read the container identifier for more information. The container identifier may be associated with information regarding a customer order associated with the container identifier. In some examples, the customer order may have information about the items to be stored or shipped in the container, the customer who ordered the items to be stored or shipped, the customer who will receive the items to be stored or shipped, and other similar information. This information may be stored in a database and accessed by identifiers stored in the container identifier.

At 706, the process 700 accesses customer information associated with the customer. In some examples, accessing the customer information associated with the customer may be performed by the information analysis component 304 (FIG. 3). In some examples, the customer information may include order history information, wishlist information, customer preference information, demographic information, and other similar information. The customer information may be stored in one or more databases associated with an electronic marketplace. It may be updated as customers browse the inventory of the electronic marketplace online and order items.

At 708, the process 700 selects a message corresponding to the customer order. In some examples, selecting the message may be performed by the message selection component 306 (FIG. 3). In some examples, the message may be selected by analyzing different aspects of the customer order including order history information, wishlist information, customer preference information, demographic information, and other similar information, at least some of which may have been accessed at 706. The message may be specifically selected to target one or more aspects of the customer order. In other examples, the message may be selected to target one or more aspects of the customer or a recipient of the order. In this example, the message may be selected because it has to do with the same item category as the one or more items associated with the customer order. In some examples, the message may be generated by the customer as part of placing the customer order. In this example, the customer may input a message to be marked on the container when ordering the one or more items associated with the customer order. In other examples, the message may be selected at random from a plurality of messages that correspond to the customer order. In some examples, the message may be selected dynamically as containers moving through an inventory conveyance system are identified, scanned, analyzed, and a targeted message is chosen for them. In other examples, a message is pre-selected for all containers going through the inventory system for a period of time, and only the dimensions of the message are adjusted based on the size of the container passing by the laser marking system. In yet another example, the message and dimensions of the message are preselected for all containers going through the inventory system for a certain period of time.

At 710, the process 700 provides the message to a laser marking system. In some examples, providing the message to a laser marking system may be performed by the marking system management component 308 (FIG. 3). Providing the message may include providing a file corresponding to the message, providing instructions to apply the message, providing a location where the laser marking system can retrieve the message, and any suitable combination of the foregoing. In some examples, in lieu of or in addition to, providing the message to the laser marking system, the process 700 may laser the message on the container. This may include operating a laser to cause a reaction between a laser-reactive coating and the laser.

FIG. 8 depicts the process 800 including example acts or techniques relating to selecting messages for application on item containers as described herein. The selected messaging engine 102 (FIG. 1) may perform the process 800 of FIG. 8. The process 800 begins at 802 by receiving an indication that a container associated with a customer order has been identified. In some examples, receiving the indication that the container identifier has been identified may be performed by the identification component 302 (FIG. 3). In some examples, the container may be identified by a container identifier attached to the side of the container. A sensor may scan, searching for container identifiers moving along a moving surface of an inventory conveyance system. In some examples, the container may be identified by a barcode attached to the side of the container. A sensor may scan, searching for barcodes moving along the moving surface. In some examples, identifying the container may include a sensor detecting a leading edge of the container and providing an indication to a computer executing the process 800. In some examples, the container may be associated with the customer order via a container identifier attached to the container.

At 804, the process 800 identifies a customer associated with the customer order. In some examples, identifying a customer associated with the customer order may be performed by the identification component 302. In some examples, the customer may be the person who placed the customer order in an electronic marketplace. In other examples, the customer may be the person who will receive the customer order from the electronic marketplace. In some examples, identifying the customer may include accessing one or more databases using the container identifier to identify the customer.

At 806, the process 800 accesses customer information associated with the customer. In some examples, accessing customer information associated with the customer may be performed by the information analysis component 304 (FIG. 3). Accessing the customer information may include accessing one or more databases in which the customer information may be stored. The customer information may include, for example, demographic information, customer preference information, order history information, and other similar information. In some examples, the customer information may include only information regarding the order associated with the container. The information may be accessed via a customer identifier, or it may be accessed in another manner.

At 808, the process 800 determines an available area on at least one side of the container for application of one or more targeted messages. In some examples, determining an available area on the at least one side of the container for application of the one or more targeted messages may be performed by the message selection component 306 (FIG. 3). In some examples, the available area may be identified via a container identifier located on a side of the container. In some examples, the available area may be identified via a barcode located on a side of the container. In some examples, the available area may be determined by an optical sensor scanning the container.

At 810, the process 800 selects, based in part on the available area and the customer information, a targeted message from a plurality of targeted messages to apply to the available area on the at least one side of the container. In some examples, selecting the message may be performed by the message selection component 306. In some examples, the message selection process involves comparing aspects of the customer information to aspects of the plurality of messages. In this example, the process may compare attributes of the demographic information to attributes of the plurality of targeted messages to find one or more targeted messages that correspond to the demographic attributes of the customer. In another example, the process may compare aspects such as order history information to find one or more targeted messages that correspond to previous orders from the customer.

In some examples, multiple messages may be appropriate to mark on the available area on the at least one side of container. The process may use the information about the available area and dimensions of the multiple messages to choose which message may be appropriate to mark on the available area. In other examples, multiple messages may be appropriate based on both customer information and dimensions of the available area, so the process may choose one or more messages at random from the selection of appropriate messages.

In some examples, there may be multiple versions of the same message, but with varying dimensions in the plurality of messages. In this example, the process may use the information about the available area on the side of the container to select a message from the plurality of messages.

At 812, the process 800 provides the selected targeted message to a laser marking system. In some examples, providing the message to the laser marking system may be performed by the marking system management component 308 (FIG. 3). In some examples, one or more distinct messages are provided to the laser marking system as distinct containers move through a conveyance system. In some examples, one or more distinct messages are provided to the laser marking system as distinct containers stop at the laser marking system. In some examples, the same one or more messages are provided to a laser marking system for distinct containers as they move through a conveyance system. In some examples, the same one or more messages are provided to a laser marking system for distinct containers as they stop at the laser marking system.

FIG. 9 depicts the process 900 including example acts or techniques relating to selecting messages for application on item containers as described herein. The selected messaging engine 102 (FIG. 1) may perform the process 900 of FIG. 9. The process 900 begins at 902 by accessing customer information associated with a customer. In some examples, accessing customer information may be performed by the identification component 302 (FIG. 3). In some examples, the customer information may be demographic information, customer preference information, order history information, and other similar information. In other examples, the information may identify a specific order associated with the customer.

At 904, the process 900 accesses a plurality of messages. In some examples, accessing a plurality of messages may be performed by the message selection component 306 (FIG. 3). In some examples, the plurality of messages may be distinct messages. In some examples, the plurality of messages may be multiple versions of a same message with varying dimensions.

In some examples, the plurality of messages may be locally stored on a computer system connected to a laser marking system. In other examples, the plurality of messages may be stored in a separate location (e.g., in connection with a network server), and a computer system connected to a laser marking system may access the plurality of messages via any suitable network connection.

At 906, the process 900 compares attributes of the plurality of messages with attributes of the customer information. In some examples, comparing attributes of the plurality of messages with attributes of the customer information may be performed by the information analysis component 304 (FIG. 3). For example, the process may compare an item category regarding a most recent order from the customer with an item category corresponding to the selected message. In some examples, the process may compare actual demographic information or estimated demographic information gleaned from the customer information with demographic information regarding the plurality of messages and their targeted audiences. In some examples, the process may take information about a most recent order from the customer as well as an order history from the customer and compare it with aspects of the plurality of messages.

At 908, the process 900 selects one or more messages from the plurality of messages based at least in part on the comparison completed at 906. In some examples, selecting the one or more messages may be performed by the message selection component 306. In some examples, the comparison at 906 may provide only one option for an appropriate message. In other examples, the comparison may provide multiple messages which have attributes that correspond to attributes of customer information. In these examples, the process may choose a message that corresponds most closely to the customer information, as compared to some threshold of appropriateness. In other examples, the process may choose a message at random from the portion of the plurality of messages that corresponds to the customer information. In another example, the process may choose multiple messages that correspond to the customer information.

At 910, the process 900 provides the one or more messages to a laser marking system. In some examples, providing the one or more messages may be performed by the marking system management component 308 (FIG. 3). In some examples, the process 900 provides the one or more messages to a laser marking system in one action. In another example, the process provides one message at a time to a laser marking system, and only stops providing messages to the laser marking system when either there are no more selected messages to provide to the laser marking system or there is no available area on a container to mark a next message.

Figure 10:
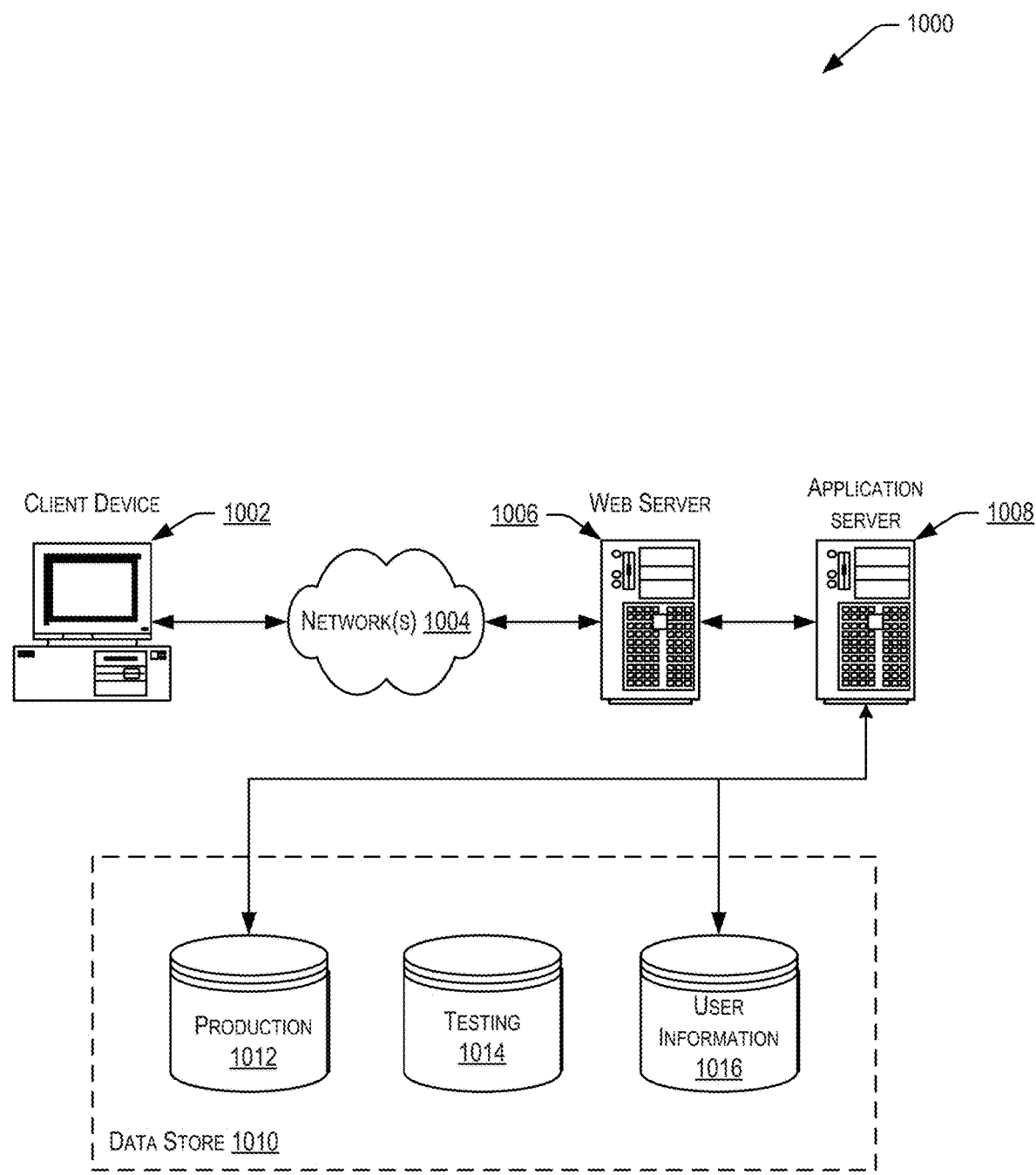
FIG. 10 is an example schematic environment for implementing techniques related to selecting targeted messages for application on moving containers as described herein, according to at least one example.

FIG. 10 illustrates aspects of an example schematic environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any suitable device operable to send and receive requests, messages, or information over a suitable network 1004 and convey information back to a user of the device. Examples of such client devices include personal computers, cell phones, handheld messaging devices, laptop computers, set-top containers, personal data assistants, electronic book readers, or other client devices. The network can include any suitable network, including an intranet, the Internet, a cellular network, a local area network or any suitable such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for accessing requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any suitable device or combination of devices capable of storing, accessing and retrieving data, which may include any suitable combination and number of data servers, databases, data storage devices and data storage media, in any suitable standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the electronic client device 1002 and the application server 1108, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1116, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In some examples, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of suitable applications. User or client devices can include any suitable number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of suitable commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and any suitable combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation, those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any suitable method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk ("DVD") or other optical storage, magnetic cassettes, magnetic tape, magnetic disk storage or other magnetic storage devices or any suitable medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example-like language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and at least one of Z to each be present.

Preferred embodiments of this disclosure are described herein, including the best mode known to the inventors for carrying out the described embodiments. Variations of those preferred embodiments may become apparent to those of ordinary skill in the art upon reading the foregoing description. The inventors expect skilled artisans to employ such variations as appropriate and the inventors intend for the embodiments disclosed herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   identifying a packing box containing one or more items associated with a customer order based at least in part on a box identifier, the packing box identified while in motion;
   identifying, based at least in part on the box identifier, a customer associated with the customer order;
   accessing a customer profile corresponding to the customer, the customer profile comprising an arrangement of at least a portion of customer information associated with the customer into one or more customer attributes, the customer information comprising one or more of customer order information, historical order information, historical viewing information, demographic information, or customer preference information;
   receiving sensor data from one or more optical sensors that scan at least a portion of one side of the packing box;
   determining, based at least in part on the box identifier and the received sensor data, an available area on at least one side of the packing box for application of one or more targeted messages, at least a portion of the available area having a laser-reactive coating applied therein;
   selecting, based at least in part on the available area and the customer profile, a targeted message from a plurality of targeted messages, wherein the selected targeted message is targeted to the customer order and is sized to fit within the available area;
   determining, based at least in part on physical characteristics of the targeted message and capabilities of a laser marking system, whether the targeted message is printable on the at least one side of the packing box, the determining comprising determining whether the targeted message is printable based at least in part on a rate at which the packing box is conveyed by a conveyance system configured to carry the packing box while the laser marking system applies the targeted message; and
   in accordance with a determination that the targeted message is printable, applying, via the laser marking system, the targeted message on the at least one side of the packing box within the available area by causing a reaction between a portion of the laser-reactive coating and the laser or in accordance with a determination that the targeted message is not printable, generating a notification comprising at least one of a warning or a suggestion for modifying the message.

2. The computer-implemented method of claim 1, wherein the targeted message comprises one or more of an advertisement directed to the customer, an advertisement directed to a recipient of the customer order other than the customer, a personalized message created by the customer, a default message, a product labeling message corresponding to the one or more items included in the packing box, a shipping information message including shipping information corresponding to the customer order, or a regulatory labeling message corresponding to the one or more items included in the packing box.

3. The computer-implemented method of claim 1, wherein at least the targeted message is generated by an advertising entity.

4. The computer-implemented method of claim 1, wherein selecting the targeted message includes:
   accessing one or more message attributes corresponding to the targeted message, individual message attributes describing aspects of the targeted message; and
   selecting the targeted message by at least comparing a first portion of the one or more customer attributes with a first portion of the one or more message attributes.

5. A computer-implemented method, comprising:
   accessing information identifying a container containing one or more items via a container identifier, the container identifier at least identifying:
      the container associated with the container identifier; and
      a customer order associated with the container identifier and identifying the one or more items;
   identifying, based at least in part on the container identifier, a customer associated with the customer order;
   accessing a customer profile comprising an arrangement of a portion of customer information into one or more customer attributes, the customer information associated with the customer;
   selecting, based at least in part on the customer profile a message, the message corresponding to the customer order;
   receiving sensor data from one or more optical sensors that scan at least a portion of one side of the container;
   determining, based at least in part on the container identifier and the sensor data, an available area on at least one side of the container for application of the message;
   determining, based at least in part on physical characteristics of the message, the available area, and capabilities of a laser marking system, whether the message is printable on the at least one side of the container, the determining comprising determining whether the message is printable based at least in part on a rate at which the container is conveyed by a conveyance system configured to carry the container while the laser marking system applies the message; and in accordance with a determination that the message is printable, providing the message to the laser marking system, the laser marking system configured to apply the message on the at least one side of the container, within the available area, while the container is in motion laser or in accordance with a determination that the message is not printable, generating a notification comprising at least one of a warning or a suggestion for modifying the message.

6. The computer-implemented method of claim 5, wherein the customer information comprises one or more of customer order information, historical order information, historical viewing information, demographic information, or customer preference information.

7. The computer-implemented method of claim 5, further comprising determining a container size associated with the container by one or more of:

receiving barcode information obtained from a barcode attached to the container, the barcode information detected by a sensor while the container moves relative to the sensor, the barcode information at least identifying the container size;

identifying, based at least in part on the container identifier, the container size; or determining the container size based at least in part on image information representative of at least a portion of the container, wherein the container size indicates at least one dimension corresponding to the at least one side of the container.

8. The computer-implemented method of claim 7, wherein selecting the message includes selecting the message from a plurality of messages, the selected message corresponding to the customer order and the determined container size.

9. The computer-implemented method of claim 7, wherein selecting the message includes scaling up or scaling down a size of the message to correspond to the determined container size.

10. The computer-implemented method of claim 5, wherein the message comprises at least one of a customer-generated message or an advertisement.

11. The computer-implemented method of claim 5, wherein the message comprises an advertisement associated with at least one item category of an electronic marketplace, and wherein selecting the message includes selecting the advertisement by:

identifying the at least one item category;

identifying one or more item categories to which the one or more items belong; and selecting the advertisement, based at least in part on the at least one item category and the one or more item categories.

12. The computer-implemented method of claim 5, wherein selecting the message includes selecting the message randomly from a plurality of qualified messages, the plurality of qualified messages qualified for a set of customers to which the customer belongs.

13. The computer-implemented method of claim 5, wherein the container comprises a first container, the customer comprises a first customer, the customer information comprises first customer information, the container identifier comprises a first container identifier, the customer order comprises a first customer order, the message comprises a first message, the method further comprising, after providing the first message to the laser marking system:

identifying, based at least in part on a reading of a second container identifier associated with a second container, a second customer associated with a second customer order, the second container identifier being read while the second container is in motion;

selecting, based at least in part on second customer information associated with the second customer, a second message corresponding to the second customer order, the second message distinct from the first message; and providing the second message to the laser marking system to apply the second message to at least one side of the second container.

14. A system, comprising:

a laser;

a first sensor;

a second sensor comprising an optical sensor; and a computing device in communication with the first sensor, the second sensor, and the laser, the computing device comprising a memory and a processor configured to:

receive first sensing information collected via the first sensor, the first sensing information at least identifying a container and indicating one or more dimensions of the container, the container containing one or more items;

receive second sensing information collected via the second sensor, the second sensing information comprising optical information corresponding to at least a portion the container;

access a customer profile comprising one or more customer attributes;

determine, based at least in part on the one or more dimensions and the optical information, an available area on at least one side of the container for application of one or more messages;

select a message from a plurality of messages based at least in part on the customer profile, at least a portion of the plurality of messages comprising one or more versions of the message having various dimensions;

select a version of the message based at least in part on the available area;

determine, based at least in part on physical characteristics of the version of the message and capabilities of the laser, whether the version of the message is printable on the at least one side of container by at least determining whether the message is printable based at least in part on a rate at which the container is conveyed by a conveyance system configured to carry the container while the laser applies the message; and in accordance with a determination that the message is printable, provide the version of the message to the laser to apply the message to the container within the available area while the container is in motion or in accordance with a determination that the message is not printable, generating a notification comprising at least one of a warning or a suggestion for modifying the message.

15. The system of claim 14, wherein at least a portion of the available area comprises a laser-reactive coating applied therein, and wherein the laser applies the message to the container within the available area by at least causing a reaction between a laser beam of the laser and a portion of the laser-reactive coating.

16. The system of claim 14, further comprising:
a conveyance system configured to carry one or more containers including the container at least between a first position where the sensor is located and a second position where the laser is located, wherein the sensing information collected via the sensor is collected while the container is being carried by the conveyance system proximate the first position in a direction toward the second position, and wherein the computing device is further configured to:
   instruct the laser to apply the selected version of the message to the container within the available area while the container is being carried by the conveyance system proximate the second position.

17. The system of claim 14, further comprising a second laser in communication with the computing device, the laser configured to apply a first portion of the message to the container within the available area and the second laser configured to apply a second portion of the message to the container within the available area.

18. The system of claim 14, wherein the laser is configured to apply the message to the container within the available area on a first side of the container, and wherein the system further comprises a second laser in communication with the computing device, the second laser configured to apply a second message to the container within a second available area on a second side of the container that is distinct from the first side.

* * * * *